(12) United States Patent
Wisniewski et al.

(10) Patent No.: US 11,021,043 B2
(45) Date of Patent: Jun. 1, 2021

(54) HARD STOP DETECTION DEVICE FOR HVAC DOOR (VALVE)

(71) Applicant: DENSO International America, Inc., Southfield, MI (US)

(72) Inventors: Christopher Wisniewski, Ann Arbor, MI (US); Jason Wagnitz, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 347 days.

(21) Appl. No.: 16/272,711

(22) Filed: Feb. 11, 2019

(65) Prior Publication Data

US 2019/0351738 A1 Nov. 21, 2019

Related U.S. Application Data

(60) Provisional application No. 62/673,215, filed on May 18, 2018.

(51) Int. Cl.
*B60H 1/00* (2006.01)

(52) U.S. Cl.
CPC ..... *B60H 1/00835* (2013.01); *B60H 1/00692* (2013.01); *B60H 1/00978* (2013.01)

(58) Field of Classification Search
CPC ............ B60H 1/00835; B60H 1/00692; B60H 1/00978; B60H 1/00664; B60H 2001/00728; B60H 1/00842; B60H 1/00864

USPC .......................................................... 454/75
See application file for complete search history.

(56) References Cited

U.S. PATENT DOCUMENTS

| | | | | |
|---|---|---|---|---|
| 6,814,137 B2* | 11/2004 | Tsurushima | ....... | B60H 1/00064 165/103 |
| 8,302,674 B2* | 11/2012 | Kim | ................... | B60H 1/00064 165/202 |

* cited by examiner

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

The present disclosure includes a heating, ventilation, and air conditioning (HVAC) door diagnostic system. The system has a rotatable hard stop lever that contacts, and restricts movement of, both a first airflow control door and a second airflow control door beyond a stop position when both the first airflow control door and the second airflow control door are present and moving in sync. When one of the first and second airflow control doors is not present or the first and second airflow control doors are not in sync, only one of the first and second airflow control doors will: contact the hard stop lever at the stop position, rotate the hard stop lever, and move beyond the stop position. The HVAC door diagnostic system generates a failure notice when the first airflow control door or the second airflow control door moves beyond the stop position.

20 Claims, 7 Drawing Sheets

HARD STOP DETECTION DEVICE FOR HVAC DOOR (VALVE)

CROSS-REFERENCE TO RELATED APPLICATION

This application claims the benefit of U.S. Provisional Application No. 62/673,215 filed on May 18, 2018, the entire disclosure of which is incorporated herein by reference.

FIELD

The present disclosure relates to a hard stop detection device for an HVAC door (valve).

BACKGROUND

This section provides background information related to the present disclosure, which is not necessarily prior art.

Vehicle heating, ventilation, and air conditioning (HVAC) systems typically include an HVAC case housing a heater core for heating airflow. The HVAC case further includes a plurality of airflow control doors that are movable to open and close outlets through which airflow exits the HVAC case, to thereby control airflow exiting the HVAC case. The doors are often controlled by one or more servomechanisms. Some original equipment manufacturers (OEMs) require door hard stop detection for diagnostic checks, such as OBDII checks. Such checks often include installing the doors at hard stop locations and verifying proper travel distance with the HVAC control system.

While such diagnostic checks are suitable for their intended use, they are subject to improvement. For example, for HVAC systems in which a servomechanism controls a single (1) door or (2) doors, it is possible to detect whether the door is present by running the door to its extreme position. If the door is missing or broken, the servo will be able to travel further than expected. If more than two (2) doors are controlled by a single (1) servo, then detecting the presence of all doors is difficult. This is because one door could fail or be missing while the other door(s) would provide proper hard stop positions for the servo and the HVAC controller. There is thus a need in the art for an HVAC diagnostic system that can detect if a door is missing or broken in situations where a multitude of doors are controlled by a single input. The present disclosure advantageously includes an HVAC door diagnostic system that detects whether an airflow control door is missing or broken in an HVAC system in which actuation of a plurality of airflow control doors are controlled by a single input (such as a single servo).

SUMMARY

This section provides a general summary of the disclosure, and is not a comprehensive disclosure of its full scope or all of its features.

The present disclosure includes a heating, ventilation, and air conditioning (HVAC) door diagnostic system. The system has a rotatable hard stop lever that contacts, and restricts movement of, both a first airflow control door and a second airflow control door beyond a stop position when both the first airflow control door and the second airflow control door are present and moving in sync. When one of the first and second airflow control doors is not present or the first and second airflow control doors are not in sync, only one of the first and second airflow control doors will: contact the hard stop lever at the stop position, rotate the hard stop lever, and move beyond the stop position. The HVAC door diagnostic system generates a failure notice when the first airflow control door or the second airflow control door moves beyond the stop position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-4 illustrate an exemplary heating, ventilation, and air conditioning (HVAC) door diagnostic system 10 in accordance with the present disclosure. The HVAC door diagnostic system 10 can be used with any suitable HVAC system, such as any suitable vehicle HVAC system. Exemplary vehicles that the HVAC door diagnostic system 10 may be used with include passenger vehicles, mass transit vehicles, commercial vehicles, utility vehicles, recreational vehicles, construction vehicles/equipment, military vehicles/equipment, watercraft, aircraft, etc. The HVAC door diagnostic system 10 may also be used in any suitable non-vehicular applications, such as building HVAC systems.

Figure 4:
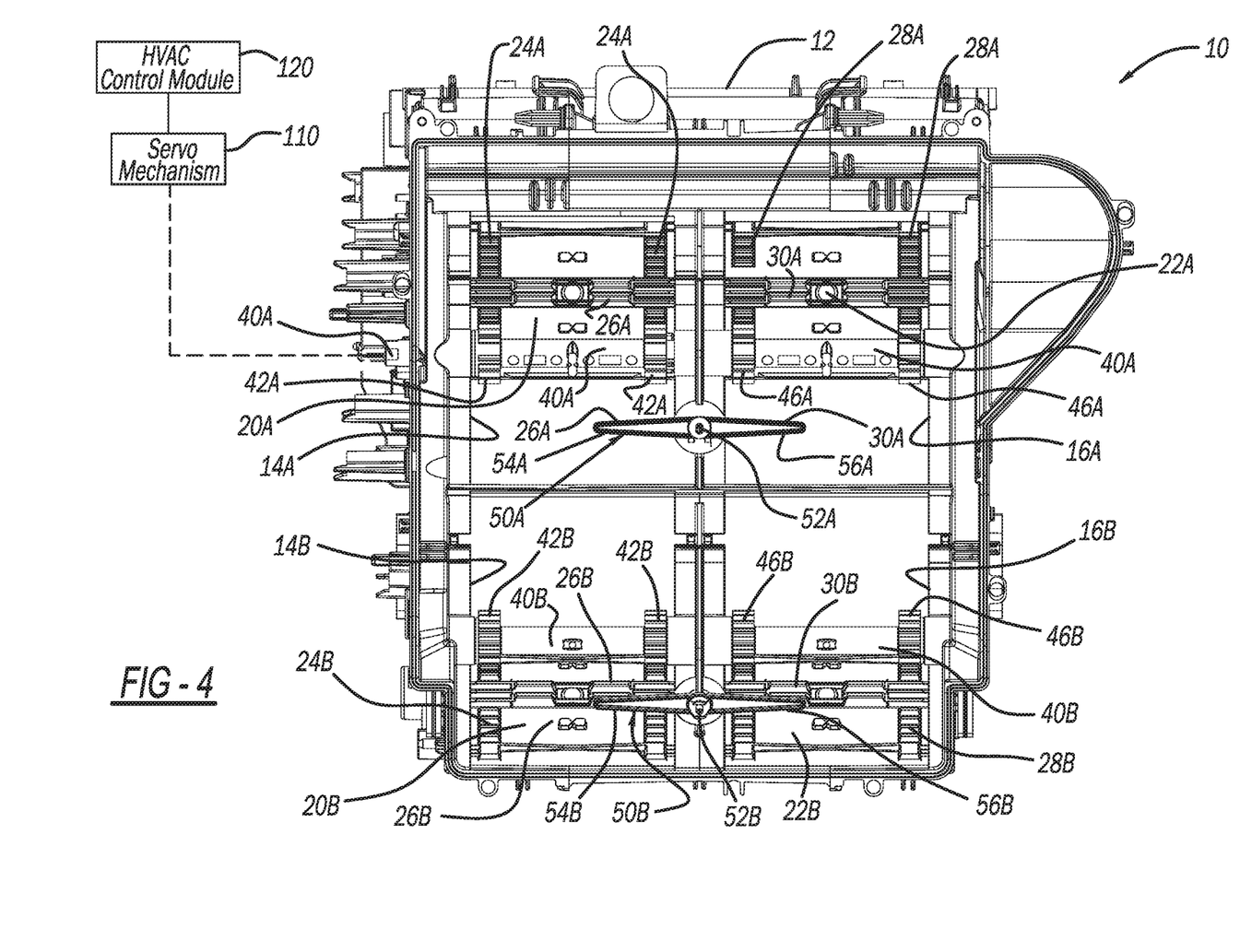
FIG. 4 illustrates the HVAC case of FIG. 1 with the doors thereof in an open (maximum hot) position.

The HVAC door diagnostic system 10 includes an HVAC case 12. The HVAC case 12 defines any suitable number of airflow apertures, through which airflow exits the HVAC case 12 and is directed to any suitable location, such as a passenger's side or a driver's side of a vehicle. With particular reference to FIG. 4, the HVAC case 12 defines a first upper aperture 14A, a first lower aperture 14B, a second upper aperture 16A, and a second lower aperture 16B. Airflow through the first upper aperture 14A may be directed to an upper portion of the passenger's side of the vehicle.

Airflow through the first lower aperture 14B may be directed to a lower portion of the passenger's side. Airflow through the second upper aperture 16A may be directed to an upper portion of the driver's side of the vehicle. Airflow through the second lower aperture 16B may be directed to a lower portion of the driver's side of the vehicle. Airflow through the apertures 14A, 14B, 16A, and 16B is respectively controlled by a first upper airflow control door (or valve) 20A, a first lower airflow control door (or valve) 20B, a second upper airflow control door (or valve) 22A, and a second lower airflow control door (or valve) 22B.

The first upper airflow control door 20A includes a plurality of teeth 24A, and one or more first tabs 26A. Similarly, the second upper airflow control door 22A includes a plurality of teeth 28A, and one or more second tabs 30A. The HVAC case 12 further includes a door shaft 40A. The door shaft 40A cooperates with both the first upper airflow control door 20A and the second upper airflow control door 22A. The door shaft 40A may be a single shaft that extends across the HVAC case 12, or two or more shafts coupled together. The door shaft 40A is driven by any suitable servomechanism 110.

Figure 5:
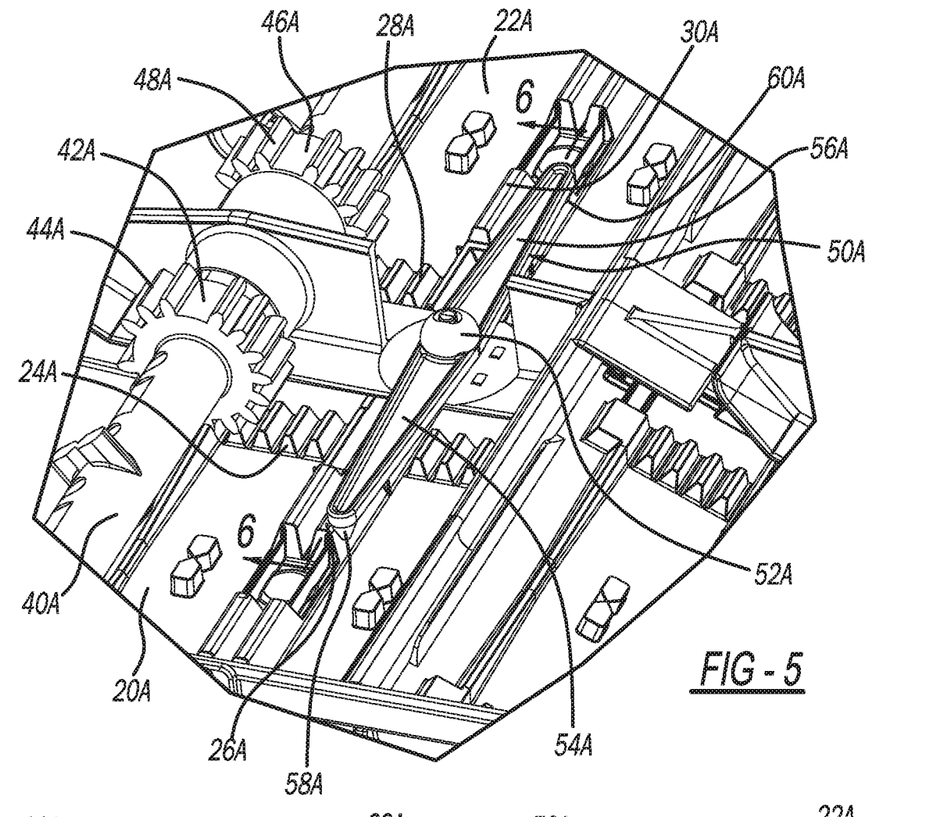
FIG. 5 illustrates interaction between a hard stop lever and doors of the HVAC case.

The door shaft 40A includes rotors 42A, each of which have rotor teeth 44A. With particular reference to FIG. 5, the rotor teeth 44A are meshed with the door teeth 24A such that rotation of the door shaft 40A actuates the first upper airflow control door 20A. The door shaft 40A further includes rotors 46A, which have rotor teeth 48A. The rotor teeth 48A are meshed with the door teeth 28A such that rotation of the door shaft 40A actuates the second upper airflow control door 22A.

The servomechanism 110 is controlled to drive the door shaft 40A by an HVAC control module 120. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the HVAC control module 120 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The first upper airflow control door 20A and the second upper airflow control door 22A are linked to the first lower airflow control door 20B and the second lower airflow control door 22B respectively. Any suitable linkage mechanism may be used, such as the linkage mechanisms illustrated in FIGS. 2 and 3, which are side views of the HVAC case 12. The first lower airflow control door 20B is similar to the first upper airflow control door 20A, and the second lower airflow control door 22B is similar to the first upper airflow control door 22A. Thus the description of the first upper airflow control door 20A and the second upper airflow control door 22A also applies to the doors 20B and 22B respectively. Features of the door 20B that are similar to the door 20A are illustrated throughout the drawings with the same reference numerals, but with the suffix "B" instead of "A." Features of the door 22B that are similar to the door 22A are illustrated with the same reference numerals, but with the letter "B" instead of "A."

Figure 1:
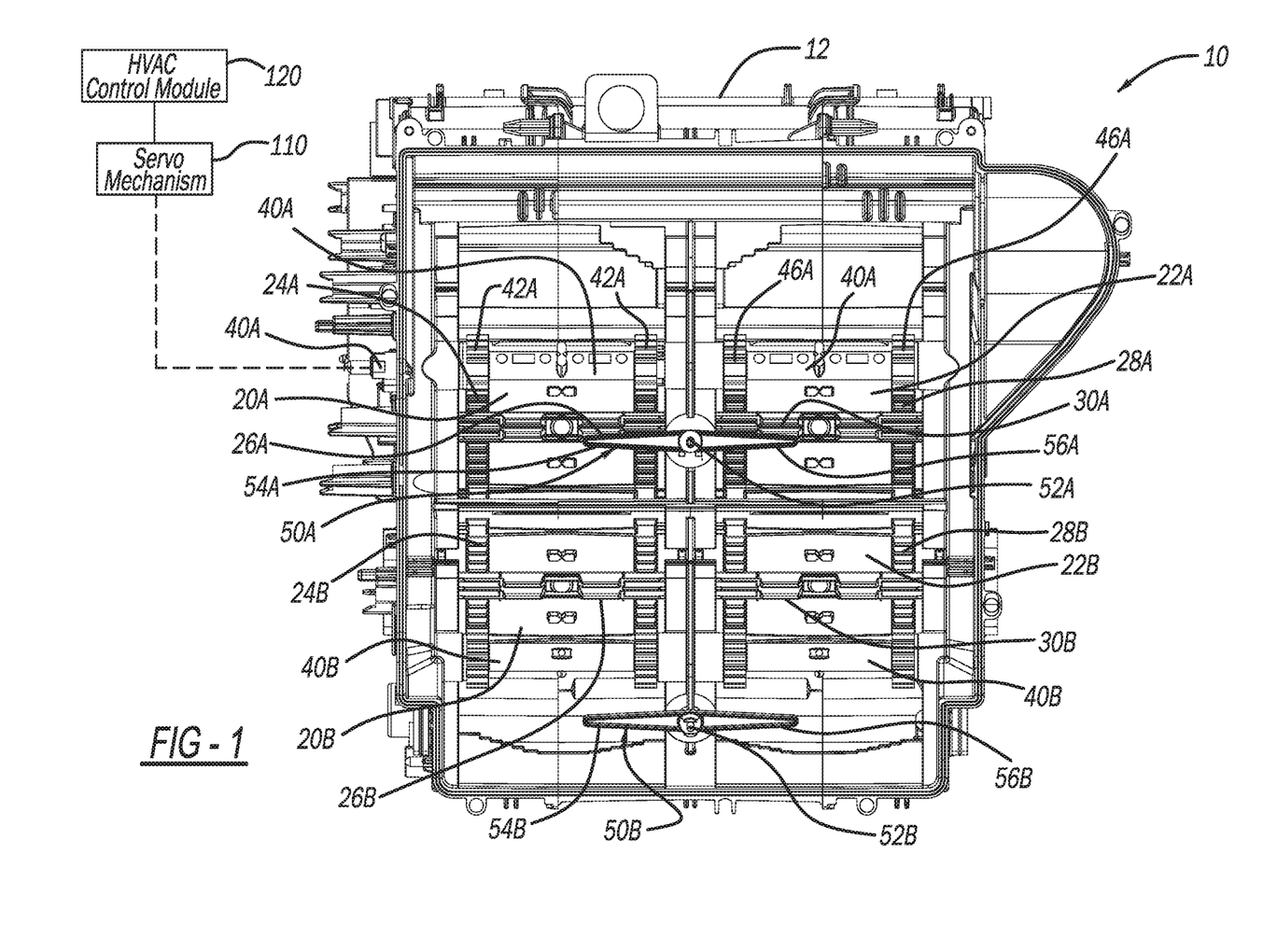
FIG. 1 illustrates an exemplary HVAC case including a door diagnostic system in accordance with the present disclosure for doors of the HVAC case, which in FIG. 1 are in a closed (maximum cold) position.
Figure 2:
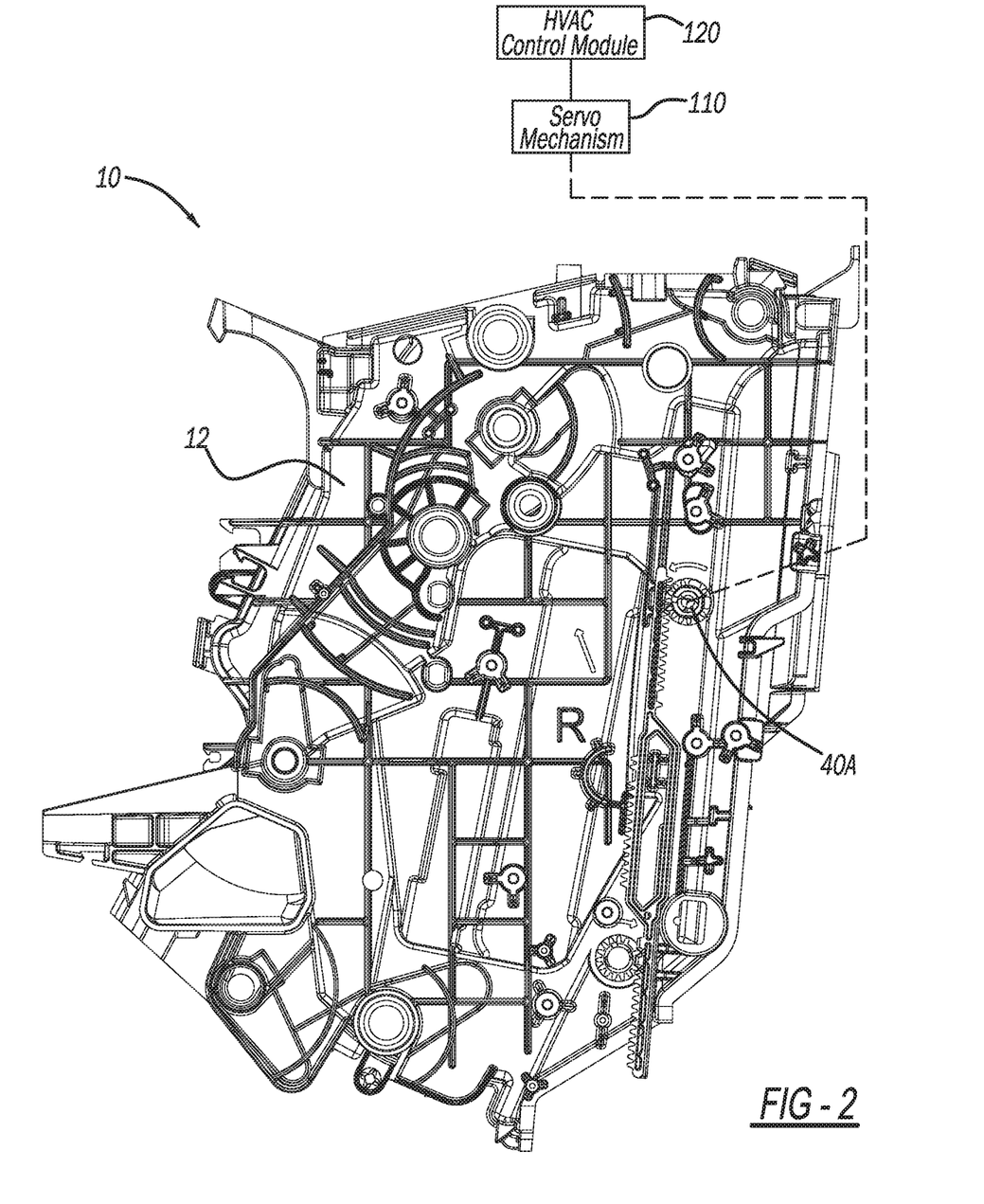
FIG. 2 illustrates a first side of the HVAC case of FIG. 1.
Figure 3:
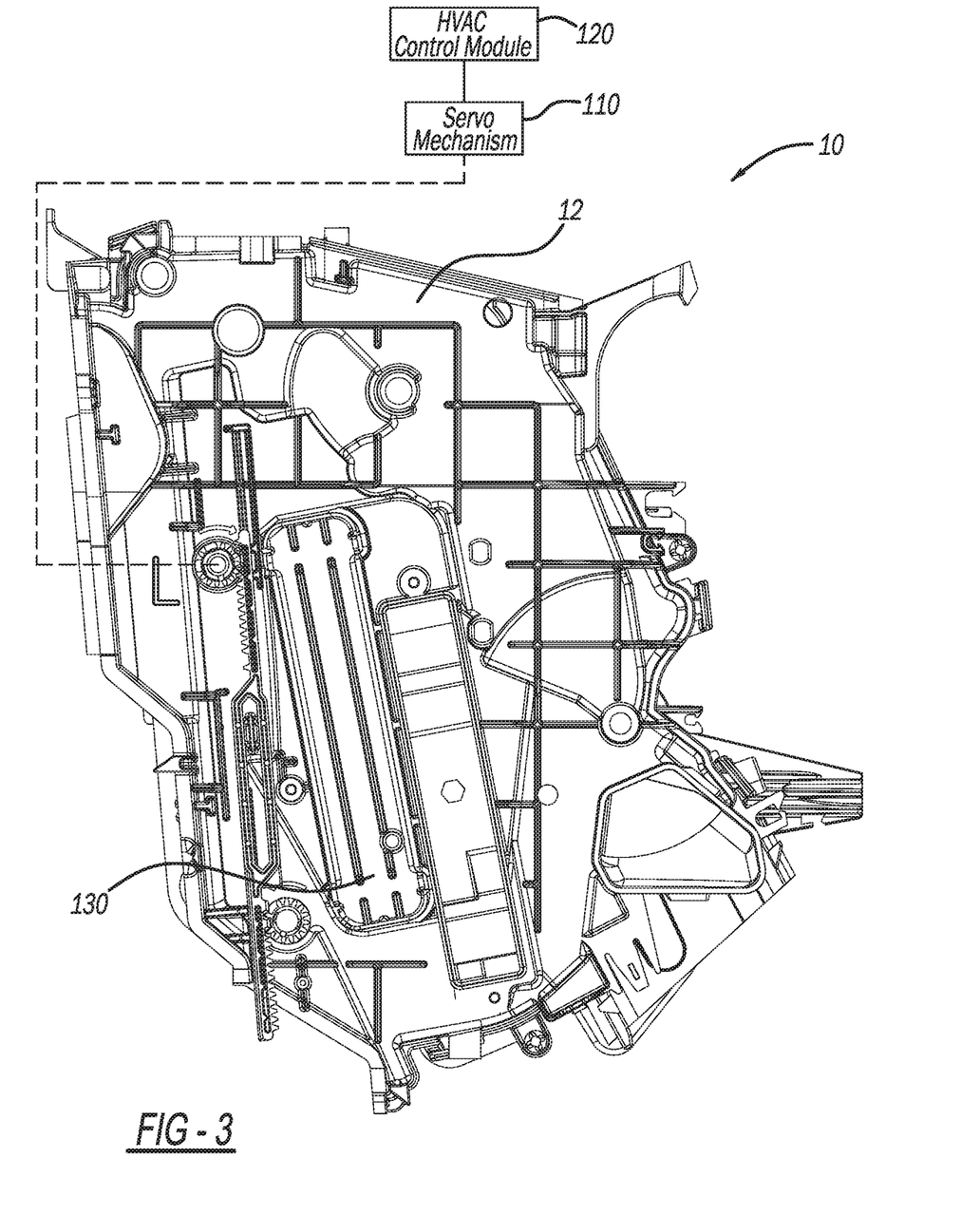
FIG. 3 illustrates a second side of the HVAC case of FIG. 1.

The doors 20A, 22A, 20B, and 22B are movable to any suitable positions to control airflow out from within the HVAC case 12. For example and as illustrated in FIG. 1, in a maximum cold position the doors 20A, 22A, 20B, and 22B are moved to a center position to block airflow heated by a heater core 130 from flowing through the airflow apertures 14A, 14B, 16A, and 16B. With reference to FIG. 4, the HVAC control module 120 is configured to move the doors 20A, 20B, 22A, and 22B to the outward position of FIG. 4 in a maximum hot position such that airflow heated by the heater core 130 is free to flow through the apertures 14A, 14B, 16A, and 16B. The doors 20A, 20B, 22A, and 22B may be moved to any suitable intermediate position as well.

Figure 6:
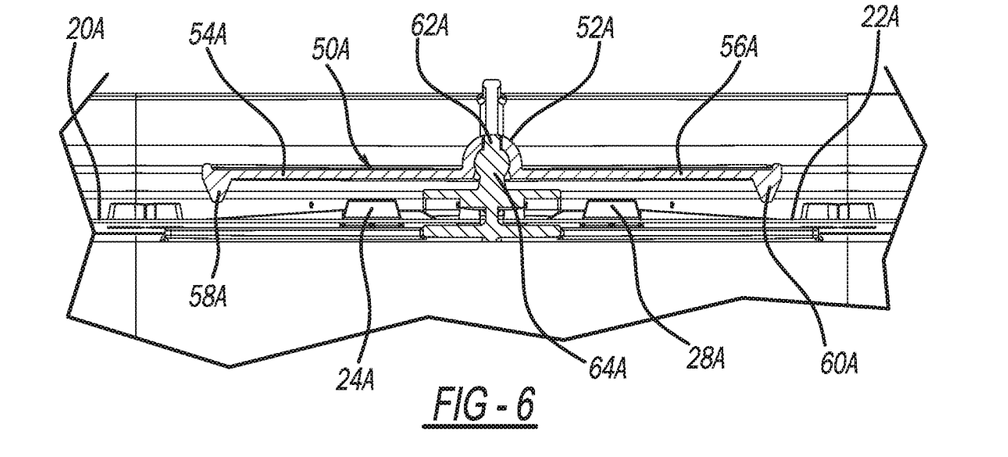
FIG. 6 is a cross-sectional view taken along line 6-6 of FIG. 5.

With continued reference to FIGS. 1, 4, and 5, and additional reference to FIG. 6, the HVAC case 12 further includes a first hard stop lever (or rocker) 50A. The first hard stop lever 50A is rotatably mounted to the HVAC case 12 between the first upper door 20A and the second upper door 22A. The first hard stop lever 50A includes a center hub 52A. Extending from opposite sides of the hub 52A is a first arm 54A and a second arm 56A. At an end of the first arm 54A is a first finger 58A. At an end of the second arm 56A is a second finger 60A. The first finger 58A is aligned with the first tab 26A, and the second finger 60A is aligned with the second tab 30A. With reference to FIG. 6, the hub 52A defines an opening in which is seated a post 62A extending from a knob 64A. The hard stop lever 50A is rotatable about the post 62A and the knob 64A. The knob 64A is rigidly mounted to the HVAC case 12 in any suitable manner.

Figure 7:
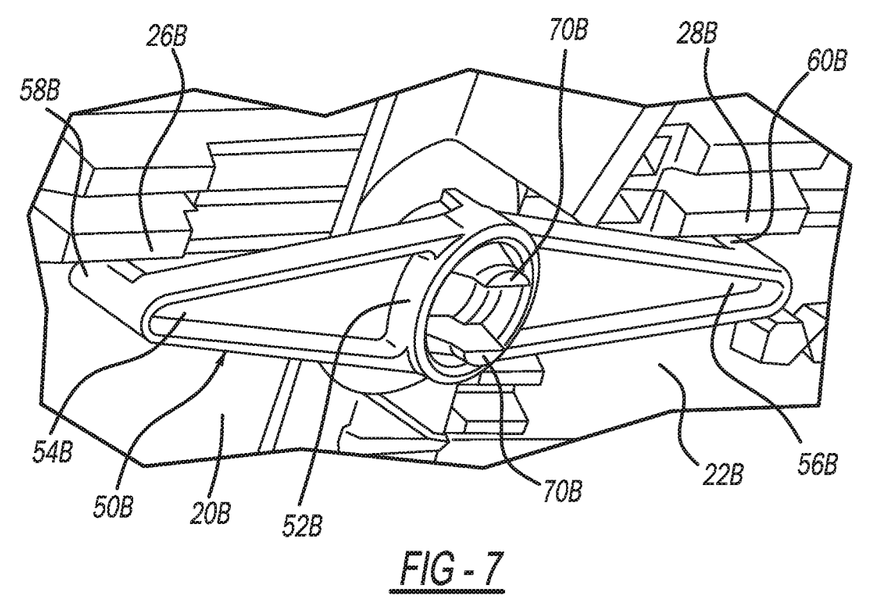
FIG. 7 illustrates another hard stop lever in accordance with the present disclosure.

The HVAC case 12 further includes a second hard stop lever (or rocker) 50B. The second lever 50B is similar to the first lever 50A, and thus features of the second lever 50B in common with the first lever 50A are designated in the drawings with the same reference numerals, but include the suffix "B" instead of "A." The only substantial difference between the lever 50B and the lever 50A is with respect to the hub 52B. Unlike the hub 52A, the hub 52B defines an opening in which flexible tabs 70B are seated, as illustrated in FIG. 7. The flexible tabs 70B are mounted to the HVAC case 12 in any suitable rigid manner. The lever 50B rotates about the flexible tabs 70B.

Although the first lever 50A is illustrated between the doors 20A and 22A, and the lever 50B is illustrated between the doors 20B and 22B, the levers 50A and 50B may be reversed. Furthermore, the HVAC case 12 may include the lever 50A between the doors 20A and 22A, as well as another lever 50A between the doors 20B and 22B. Alternatively, the lever 50B may be included between the doors 20B and 22B, and another lever 50B may be included between the doors 20A and 22A.

Figure 8:
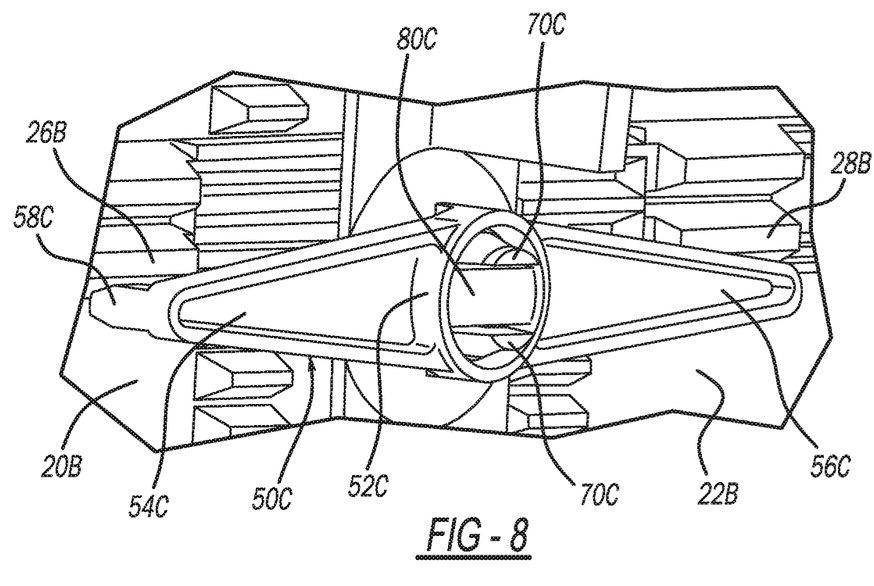
FIG. 8 illustrates an additional hard stop lever in accordance with the present disclosure.

The present disclosure also includes a hard stop lever 50C, as illustrated in FIG. 8. The hard stop lever 50C is not rotatable due to the center bar 80C extending across the hub 52C. The bar 80C is arranged between the tabs 70C, which are rigidly mounted to the HVAC case 12. The lever 50C is suitable for use in dual zone systems, in which a first servomechanism actuates the doors 20A and 20B together, and a second servomechanism actuates the doors 22A and 22B together. Thus unlike the configuration of FIG. 1 when only a single servomechanism actuates all four of the doors 20A, 20B, 22A, and 22B, the lever 52C is used in dual zone applications where the doors 20A and 20B are movable independent of the doors 22A and 22B.

Operation of the HVAC door diagnostic system 10 will now be described. With reference to FIG. 1, when both the first upper door 20A and the second upper door 22A are present and moving simultaneously in sync, and thus are operating properly as intended, the first and second fingers 58A and 58B of the hard stop lever 50A will simultaneously contact the first tab 26A and the second tab 30A to stop both doors 20A and 22A from being rotated by the door shaft 40A beyond a stop position. In the example of FIG. 1, the stop position is a lower position of the doors 20A and 22A. Similarly, in the example of FIG. 1 the doors 20B and 22B are stopped from being rotated further by the second hard stop lever 50B when the second hard stop lever 50B is simultaneously contacting the first tab 26B and the second tab 30B. In the example of FIG. 1, the second hard stop lever 50B simultaneously contacts the first lower door 20B and the second lower door 22B when both doors are in a lower position, as illustrated in FIG. 4.

Figure 9:
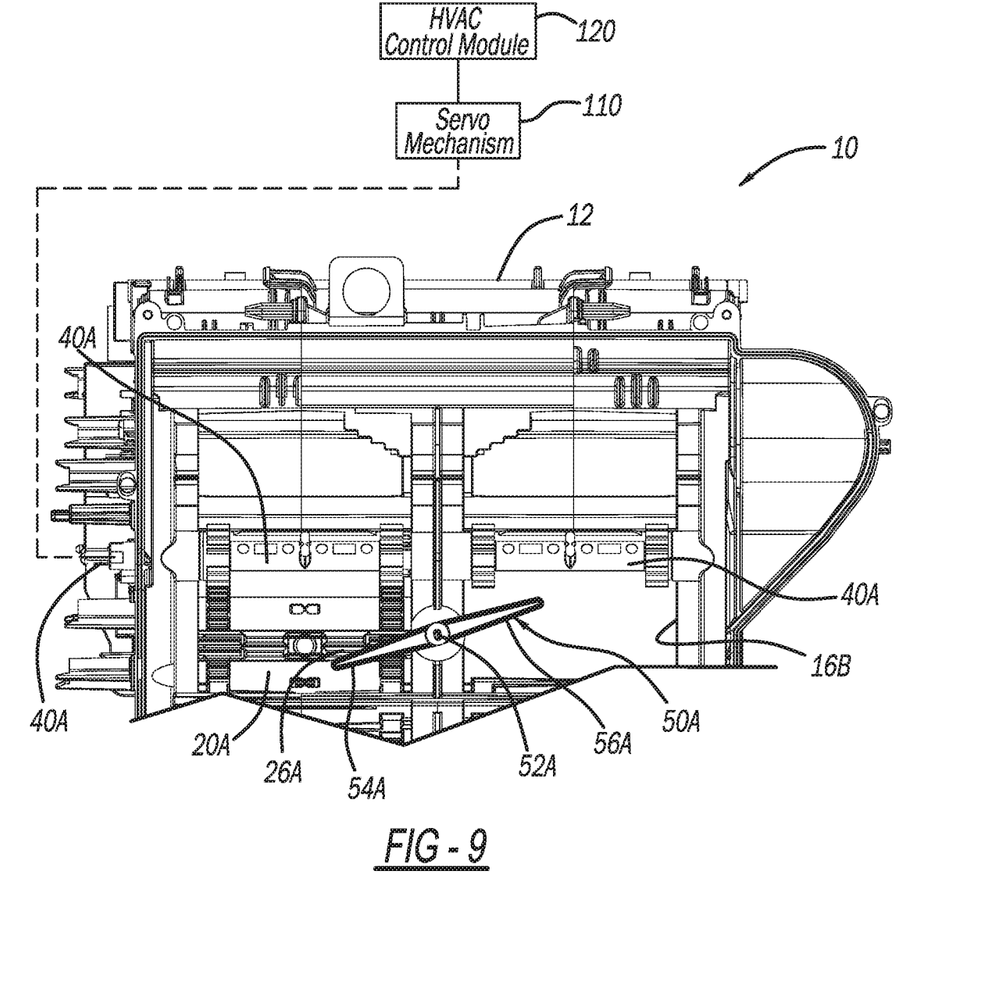
FIG. 9 illustrates the HVAC case of FIG. 1 with a door thereof missing, and the hard stop lever rotated by a present door as a result.

When one of the doors 20A or 22A is missing or not functioning properly so as to not move in sync with the other door 20A or 22A, the first hard stop lever 50A will rotate to permit the functioning door 20A or 22A to rotate beyond a stop position. For example and as illustrated in FIG. 9 where the door 22A is missing, the first hard stop lever 50A will rotate to not stop the first upper door 20A. Specifically, as the first tab 26A contacts the first finger 58A, downward movement of the first upper door 20A will push and rotate the first hard stop lever 50A because the second upper door 22A is not present to counter the rotation. The first upper door 20A will be moved beyond the stop position by the servomechanism 110. The HVAC control module 120 will detect the over rotation by the servomechanism 110 and generate any suitable failure notice. For example, the HVAC control module 120 may transmit a failure notice to any suitable diagnostic system of the vehicle whereby a technician can identify and repair the issue.

Although FIG. 9 illustrates the second upper door 22A as missing, the system 10 will operate in the same manner when the first upper door 20A is missing or not functioning in sync with the second upper door 22A. Operation of the second hard stop lever 50B to detect when one of the doors 20B, 22B is missing or not operating in sync with the other door 20B, 22B is generally the same as operation of the first hard stop lever 50A. Thus when one of the doors 20B, 22B is missing or not operating in sync with the other door 20B, 22B the second hard stop lever 50B will be rotated by the properly functioning door 20B, 22B, which will be rotated beyond a stop position by the servomechanism 110. This over rotation of the servomechanism 110 is detected by the HVAC control module 120, which generates any suitable failure notice.

The present disclosure thus advantageously provides for an HVAC door diagnostic system 10 that detects whether an airflow control door is missing or broken in a system in which actuation of a plurality of airflow control doors 20A, 22A, 20B, and 22B are controlled by a single input, such as the servomechanism 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) door diagnostic system comprising:
   a rotatable hard stop lever that contacts, and restricts movement of, both a first airflow control door and a second airflow control door beyond a stop position when both the first airflow control door and the second airflow control door are present and moving in sync;
   wherein:
      when the first and second airflow control doors are not in sync, only one of the first and second airflow control doors will: contact the hard stop lever at the stop position, rotate the hard stop lever, and move beyond the stop position; and
      the HVAC door diagnostic system generates a failure notice when the first airflow control door or the second airflow control door moves beyond the stop position.

2. The HVAC door diagnostic system of claim 1, further comprising at least one door shaft that is in cooperation with the first airflow control door and the second airflow control door to open and close the first airflow control door and the second airflow control door, the at least one door shaft is driven by a servomechanism; and
   a third airflow control door and a fourth airflow control door linked to the first airflow control door and the second airflow control door such that movement of the first airflow control door and the second airflow control door moves the third airflow control door and the fourth airflow control door.

3. The HVAC door diagnostic system of claim 1, wherein:
   the first airflow control door includes a first tab;
   the second airflow control door includes a second tab; and
   the rotatable hard stop lever contacts the first tab and the second tab to restrict movement of both the first airflow control door and the second airflow control door beyond the stop position when both the first airflow control door and the second airflow control door are present and moving in sync.

4. The HVAC door diagnostic system of claim 3, wherein the rotatable hard stop lever includes a first arm having a first finger that contacts the first tab, and a second arm having a second finger that contacts the second tab.

5. The HVAC door diagnostic system of claim 4, wherein first arm and the second arm extend from opposite sides of a hub of the rotatable hard stop lever.

6. The HVAC door diagnostic system of claim 5, wherein the hub rotates about a center post mounted to an HVAC case.

7. The HVAC door diagnostic system of claim 1, wherein the rotatable hard stop lever includes a center hub defining an aperture in receipt of tabs mounted to an HVAC case, the rotatable hard stop rotates about the tabs.

8. A heating, ventilation, and air conditioning (HVAC) door diagnostic system comprising:
   an HVAC case;
   a first airflow control door and a second airflow control door included with the HVAC case and movable to control airflow out from within the HVAC case;
   a hard stop lever rotatably mounted to the HVAC case between the first airflow control door and the second airflow control door such that the hard stop lever contacts, and restricts movement of, both the first airflow control door and the second airflow control door beyond a stop position when both the first airflow control door and the second airflow control door are present and moving in sync;
   wherein when the first and second airflow control doors are not in sync, only one of the first and second airflow control doors will: contact the hard stop lever at the stop position, rotate the hard stop lever, and move beyond the stop position;
   wherein the HVAC door diagnostic system generates a failure notice when the first airflow control door or the second airflow control door moves beyond the stop position.

9. The HVAC door diagnostic system of claim 8, further comprising at least one door shaft that is in cooperation with the first airflow control door and the second airflow control door to open and close the first airflow control door and the second airflow control door, the at least one door shaft is driven by a servomechanism; and
   a third airflow control door and a fourth airflow control door linked to the first airflow control door and the second airflow control door such that movement of the first airflow control door and the second airflow control door moves the third airflow control door and the fourth airflow control door.

10. The HVAC door diagnostic system of claim 8, wherein:
    the first airflow control door includes a first tab;
    the second airflow control door includes a second tab; and
    the hard stop lever contacts the first tab and the second tab to restrict movement of both the first airflow control door and the second airflow control door beyond the stop position when both the first airflow control door and the second airflow control door are present and moving in sync.

11. The HVAC door diagnostic system of claim 10, wherein the rotatable hard stop lever includes a first arm having a first finger that contacts the first tab, and a second arm having a second finger that contacts the second tab.

12. The HVAC door diagnostic system of claim 8, wherein the hard stop lever includes a hub, the hard stop lever is rotatably mounted to the HVAC case at the hub.

13. The HVAC door diagnostic system of claim 12, wherein the hub defines an opening at an axial center thereof in receipt of a post mounted to the HVAC case.

14. The HVAC door diagnostic system of claim 12, wherein the hub defines an opening at an axial center thereof in receipt of flexible tabs mounted to the HVAC case, the hard stop lever is rotatable about the flexible tabs.

15. A heating, ventilation, and air conditioning (HVAC) door diagnostic system comprising:
    an HVAC case;
    a first airflow control door and a second airflow control door included with the HVAC case and movable to control airflow out from within the HVAC case;
    a servomechanism configured to move both the first airflow control door and the second airflow control door in sync between a fully open position and a fully closed position;
    a hard stop lever rotatably mounted to the HVAC case between the first airflow control door and the second airflow control door such that the hard stop lever contacts, and restricts movement of, both the first airflow control door and the second airflow control door beyond the fully open position or the fully closed position when both the first airflow control door and the second airflow control door are present and moving in sync;

wherein when the first and second airflow control doors are not in sync, only one of the first and second airflow control doors will: contact the hard stop lever at the fully open position or the fully closed position, rotate the hard stop lever, and move beyond the fully open position or the fully closed position; and wherein the HVAC door diagnostic system generates a failure notice when the servomechanism moves the first or second airflow control door beyond the fully open position or the fully closed position.

16. The HVAC door diagnostic system of claim 15, wherein the servomechanism is connected to a door shaft within the HVAC case, the door shaft includes first rotor teeth meshed with first teeth of the first airflow control door and second rotor teeth meshed with second teeth of the second airflow control door;

a third airflow control door and a fourth airflow control door are linked to the first airflow control door and the second airflow control door such that movement of the first airflow control door and the second airflow control door moves the third airflow control door and the fourth airflow control door.

17. The HVAC door diagnostic system of claim 15, wherein:

the first airflow control door includes a first tab;

the second airflow control door includes a second tab; and the hard stop lever contacts the first tab and the second tab to restrict movement of both the first airflow control door and the second airflow control door beyond the fully open position or the fully closed position when both the first airflow control door and the second airflow control door are present and moving in sync.

18. The HVAC door diagnostic system of claim 17, wherein the rotatable hard stop lever includes a first arm having a first finger that contacts the first tab, and a second arm having a second finger that contacts the second tab.

19. The HVAC door diagnostic system of claim 15, wherein the hard stop lever includes a hub, the hard stop lever is rotatably mounted to the HVAC case at the hub; and wherein the hub defines an opening at an axial center thereof in receipt of a post mounted to the HVAC case.

20. The HVAC door diagnostic system of claim 15, wherein the hard stop lever includes a hub, the hard stop lever is rotatably mounted to the HVAC case at the hub; and wherein the hub defines an opening at an axial center thereof in receipt of flexible tabs mounted to the HVAC case, the hard stop lever is rotatable about the flexible tabs.

* * * * *